United States Patent
Davies et al.

(10) Patent No.: US 9,590,472 B2
(45) Date of Patent: Mar. 7, 2017

(54) THROUGH FLOW VENTILATION SYSTEM FOR A POWER GENERATION TURBINE PACKAGE

(71) Applicant: Siemens Aktiengesellschaft, Munich (DE)

(72) Inventors: James Davies, Sleaford (GB); Stephen Drury, Lincoln (GB); Andrew Wilding, Newark (GB)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/767,223

(22) PCT Filed: Jan. 22, 2014

(86) PCT No.: PCT/EP2014/051237
§ 371 (c)(1),
(2) Date: Aug. 11, 2015

(87) PCT Pub. No.: WO2014/124784
PCT Pub. Date: Aug. 21, 2014

(65) Prior Publication Data
US 2015/0381013 A1    Dec. 31, 2015

(30) Foreign Application Priority Data
Feb. 15, 2013 (EP) .................... 13155478

(51) Int. Cl.
*F01D 15/10*     (2006.01)
*F02C 6/00*      (2006.01)
(Continued)

(52) U.S. Cl.
CPC ............ *H02K 7/1823* (2013.01); *F01D 5/10* (2013.01); *F01D 15/10* (2013.01); *F02C 7/12* (2013.01);
(Continued)

(58) Field of Classification Search
USPC ......... 290/1 A, 1 R, 2, 52; 60/796, 797, 801
See application file for complete search history.

(56) References Cited

U.S. PATENT DOCUMENTS 3,418,485 A  12/1968  Anderson et Al.
3,608,310 A   9/1971  Vaught
(Continued)

FOREIGN PATENT DOCUMENTS

CN    1808858 A    7/2006
CN  101220965 A    7/2008
(Continued)

OTHER PUBLICATIONS

RU Office Action dated Dec. 8, 2016, for RU patent application No. 2015134354.

*Primary Examiner* — Pedro J Cuevas
(74) *Attorney, Agent, or Firm* — Beusse Wolter Sanks & Maire

(57) ABSTRACT

A power generation system has a housing with a first housing section (I) and a second housing section (II), an alternator arranged within the first housing section (I) and a gas turbine arranged within the second housing section (II). The alternator is drivable by the gas turbine, wherein the first housing section (I) includes an air inlet through which an airstream is injectable into the first housing section (I) such that the airstream passes the alternator and cools the alternator. The first housing section (I) is coupled to the second housing section (II) such that the airstream is feedable into the second housing section (II) after the airstream has passed the alternator. The second housing section (II) includes an air outlet through which the airstream is exhaustable after passing the gas turbine.

9 Claims, 3 Drawing Sheets

(51) Int. Cl.
*H02K 7/18* (2006.01)
*H02P 9/04* (2006.01)
*F01D 5/10* (2006.01)
*F02C 7/12* (2006.01)
*H02K 9/00* (2006.01)
*F02B 63/04* (2006.01)
*F03G 7/08* (2006.01)
*F02C 7/20* (2006.01)

(52) U.S. Cl.
CPC ............ *H02K 9/00* (2013.01); *F05D 2220/76* (2013.01); *F05D 2260/96* (2013.01)

(56) References Cited

U.S. PATENT DOCUMENTS

| | | | | |
|---|---|---|---|---|
| 3,791,682 A * | 2/1974 | Mitchell | ............ | F02C 7/20 290/1 R |
| 3,989,415 A * | 11/1976 | Van-Hee | ............ | F02B 77/13 181/224 |
| 4,002,023 A * | 1/1977 | Hartmann | ............ | F02C 7/04 290/52 |
| 4,098,077 A * | 7/1978 | Edmaier | ............ | B65D 85/68 123/41.7 |
| 4,128,769 A * | 12/1978 | Bons | ............ | F01D 25/30 181/213 |
| 4,694,190 A * | 9/1987 | Lane | ............ | F01D 25/28 248/678 |
| 5,575,349 A * | 11/1996 | Ikeda | ............ | F02B 63/04 123/41.7 |
| 5,649,418 A * | 7/1997 | Ludwig | ............ | F02C 7/08 290/52 |
| 5,731,687 A * | 3/1998 | Hirano | ............ | F02B 63/04 123/198 E |
| 5,890,460 A * | 4/1999 | Ball | ............ | F01P 1/02 123/2 |
| 6,082,094 A * | 7/2000 | Longardner | ............ | F02C 7/00 290/52 |
| 6,134,878 A * | 10/2000 | Amako | ............ | F02C 7/08 60/39.83 |
| 6,357,221 B1 * | 3/2002 | Schroeder | ............ | F01D 25/12 123/41.7 |
| 6,412,284 B1 * | 7/2002 | Horner | ............ | F01D 25/30 60/39.52 |
| 6,470,689 B2 * | 10/2002 | Schroeder | ............ | F01D 25/12 60/796 |
| 6,477,843 B2 * | 11/2002 | Schroeder | ............ | F01D 25/12 60/772 |
| 6,753,620 B2 * | 6/2004 | Fukuda | ............ | F02B 63/04 123/2 |
| 6,765,304 B2 * | 7/2004 | Baten | ............ | F02B 63/04 290/1 A |
| 6,784,560 B2 * | 8/2004 | Sugimoto | ............ | F02B 63/04 123/2 |
| 6,786,051 B2 * | 9/2004 | Kristich | ............ | F01D 25/28 60/796 |
| 6,798,079 B2 * | 9/2004 | Nelson | ............ | F01D 25/12 290/2 |
| 6,962,057 B2 * | 11/2005 | Kurokawa | ............ | F01D 25/24 248/646 |
| 6,983,607 B2 * | 1/2006 | Grove | ............ | F01D 25/14 60/39.83 |
| 7,221,061 B2 * | 5/2007 | Alger | ............ | F02B 63/04 290/1 A |
| 7,314,397 B2 * | 1/2008 | Sodemann | ............ | F01N 1/083 123/41.7 |
| 7,492,050 B2 * | 2/2009 | Brandenburg | ............ | H02K 9/06 290/1 B |
| 7,795,745 B2 * | 9/2010 | Mellon | ............ | F02B 63/04 123/2 |
| 8,544,596 B2 * | 10/2013 | Dupont | ............ | F02C 7/20 181/203 |
| 8,587,136 B2 * | 11/2013 | Williams | ............ | F01K 13/00 290/1 A |
| 8,672,606 B2 * | 3/2014 | Glynn | ............ | F01D 25/28 184/1.5 |
| 8,689,932 B2 * | 4/2014 | Dupont | ............ | F16M 1/00 181/200 |
| 8,872,361 B2 * | 10/2014 | Janscha | ............ | F02B 63/04 290/1 A |
| 9,091,215 B2 * | 7/2015 | Baten | ............ | F02C 3/32 |
| 9,376,801 B1 * | 6/2016 | Warren | ............ | E04B 1/34815 |
| 9,431,865 B2 * | 8/2016 | Janscha | ............ | F02B 63/04 |
| 9,447,982 B2 * | 9/2016 | Baten | ............ | F02C 3/32 |
| 2001/0003242 A1* | 6/2001 | Takamatsu | ............ | F01D 25/28 60/802 |
| 2002/0023426 A1* | 2/2002 | Schroeder | ............ | F01D 25/12 60/39.182 |
| 2002/0055330 A1* | 5/2002 | Schroeder | ............ | F01D 25/12 454/252 |
| 2004/0040313 A1* | 3/2004 | Kurokawa | ............ | F01D 25/24 60/796 |
| 2005/0160740 A1 | 7/2005 | Nakano et al. | | |
| 2006/0010879 A1 | 1/2006 | Aumont et al. | | |
| 2006/0080971 A1 | 4/2006 | Smith et al. | | |
| 2007/0113558 A1 | 5/2007 | Brown et al. | | |
| 2008/0098744 A1 | 5/2008 | Scalone | | |
| 2008/0166220 A1 | 7/2008 | Chen et al. | | |
| 2010/0095683 A1* | 4/2010 | Glynn | ............ | F01D 25/28 60/796 |
| 2010/0180602 A1 | 7/2010 | Johnson et al. | | |
| 2011/0214429 A1 | 9/2011 | Chen et al. | | |

FOREIGN PATENT DOCUMENTS

| | | |
|---|---|---|
| CN | 101793407 A | 8/2010 |
| CN | 102192525 A | 9/2011 |
| EP | 0616111 A1 | 9/1994 |
| EP | 1707752 A1 | 10/2006 |
| JP | H1193690 A | 4/1999 |
| JP | 4495603 A | 8/2005 |
| RU | 2365760 C1 | 8/2009 |
| RU | 111585 U1 | 12/2011 |

\* cited by examiner

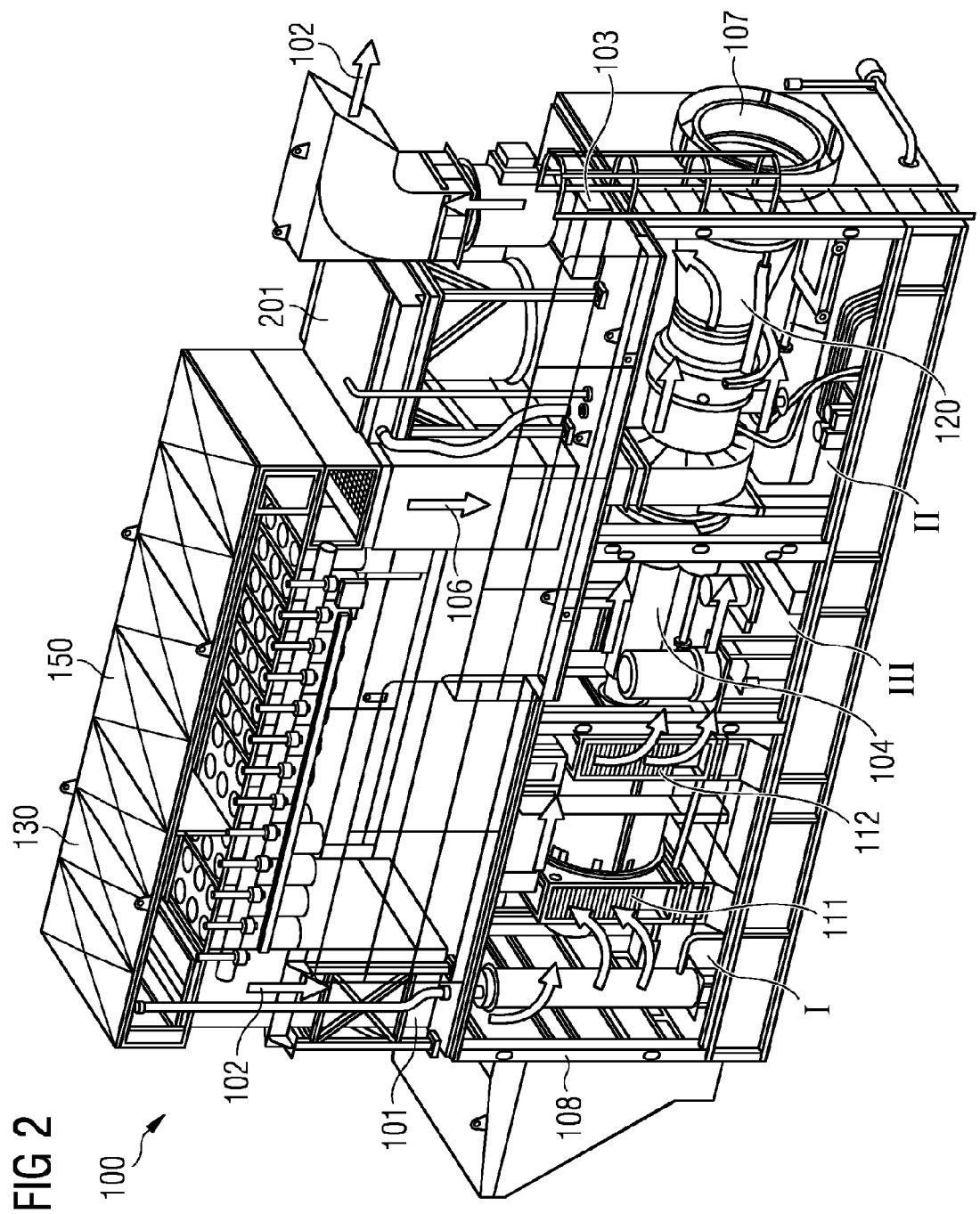

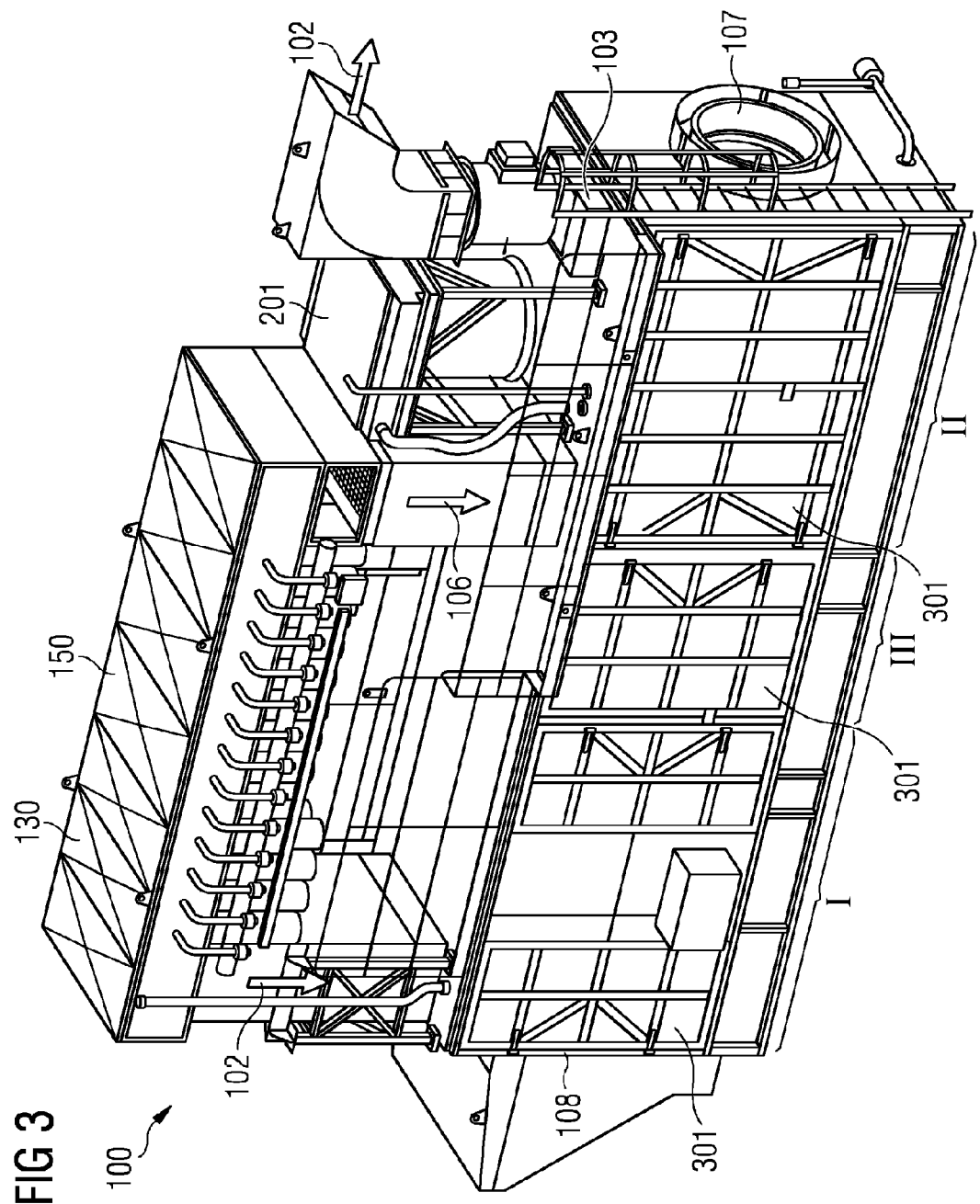

THROUGH FLOW VENTILATION SYSTEM FOR A POWER GENERATION TURBINE PACKAGE

CROSS REFERENCE TO RELATED APPLICATIONS

This application is the US National Stage of International Application No. PCT/EP2014/051237 filed Jan. 22, 2014, and claims the benefit thereof. The International Application claims the benefit of European Application No. EP13155478 filed Feb. 15, 2013. All of the applications are incorporated by reference herein in their entirety.

FIELD OF INVENTION

The present invention relates to a power generation system comprising a ventilation system and to a method of operating a power generation system comprising a ventilation system.

BACKGROUND OF INVENTION

Power generation systems consist of a gas turbine which generates mechanical power, wherein by the generated mechanical power an alternator, such as an AC-generator (AC: alternating current), is driven. The AC-generator generates electrical power which is used by ultimate consumers.

The gas turbine and the alternator are generally housed in a power generator housing or enclosure. In order to cool the gas turbine and the alternator, separated cooling systems are installed. In particular, one separate ventilation system is coupled for cooling purposes to the alternator for cooling the alternator and another separated ventilation system is coupled to the gas turbine enclosure for cooling purposes. The ventilation and cooling streams which purges the alternator are separated to the ventilation stream which purges the gas turbine cell.

U.S. Pat. No. 3,791,682 A discloses a turbine driven electrical driven generator set having one or more turbines positioned above the generator to provide a power source at locations where there is a minimum available floor space. An acoustical enclosure enclosing the turbine and generator and having air filters for filtering the generator cooling air and the intake air to the turbine. An air fan driven from the generator for cooling the generator and the oil in the turbine and the reduction gearing between the turbine and the generator through an air/oil heat exchanger. The air fan cooling the turbine after shutdown.

SUMMARY OF THE INVENTION

It may be an objective of the present invention to provide a power generation system comprising a simple and efficient ventilation arrangement.

It may be an objective of the present invention to provide a power generation system with a more effective and cheaper cooling system.

This objective is solved by a power generation system and by a method of operating a power generation system according to the independent claims.

According to a first aspect of the present invention, a power generation system is presented. The power generation system comprises a housing comprising a first housing section and a second housing section. Furthermore, the power generation system comprises an alternator arranged within the first housing section and a gas turbine arranged within the second housing section. The alternator is drivable by the gas turbine. The first housing section comprises an air inlet through which an airstream is injectable into the first housing section such that the airstream passes the alternator and cools the alternator. The first housing section is coupled to the second housing section such that the airstream is feedable into the second housing section after the airstream has passed the alternator. The second housing section comprises an air outlet through which the airstream is exhaustable after passing the gas turbine.

According to a further aspect of the present invention, a method of operating a power generation system comprising a housing with a first housing section and a second housing section, an alternator arranged within the first housing section and a gas turbine arranged within the second housing section is presented. According to the method, the alternator is driven by the gas turbine. An airstream is injected through an air inlet into the first housing section such that the airstream passes the alternator and cools the alternator. The first housing section is coupled to the second housing section such that the airstream is feedable into the second housing section after the airstream has passed the alternator. The airstream is exhausted through an air outlet of the second housing section after passing the gas turbine.

Advantageously, the method of operating a power generation system may comprise feeding a further airstream into the gas turbine via a further air inlet, the further air inlet is coupled to the gas turbine.

The housing comprises a framework which forms the respective housing sections. The housing further forms an enclosure for the components of the power generation system, such that the housing forms a closed casing with respect to the environment. The housing and the respective housing sections may form respective inner volumes which are isolated from the environment. The respective inner volumes are coupled to the environment via the respective air inlets or outlets.

The housing sections may be separated by respective separation walls. Respective openings may be formed into the separation walls, through which the airstream is guidable.

In a first housing section, the first air inlet is formed. Through the air inlet, an airstream is injectable. The airstream may be generated by a ventilation system, for example. The ventilation system may be installed externally to the housing or may be located internally within the housing. The ventilation system may comprise fans for generating the airstream. In order to provide a clean airstream, respective filter arrangements may be additionally coupled to the air inlet.

Inside the inner volume of the first housing section, the alternator, such as an AC-generator for generating electrical power—particularly with alternating current (AC)—, is installed. During operation of the alternator, heat is generated. The airstream streams along the alternator and hence passes the alternator such that the alternator is cooled.

The first housing section is separated to the second housing section. The second housing section is located downstream to the first housing section with respect to the stream direction of the airstream. Inside the inner volume of the second housing section, the gas turbine is arranged. The airstream is guided through respective openings, e.g. inside a separation wall between the first housing section and the second housing section, to the inner volume of the second housing section. Next, the airstream passes the gas turbine and hence cools the gas turbine.

A respective air outlet is arranged at the second housing section, through which the airstream may be exhausted after having passed the gas turbine.

Hence, by the present invention, only one airstream injected into the housing is necessary for cooling purposes. Further installations in order to provide a plurality of further separated airstreams injected into the housing for cooling purposes are not necessary. Hence, by the design of the above-described power generation, an overall system simplification is provided, because only one airstream for cooling both, the alternator and the gas turbine, is used. Hence, cost-intensive further installations for providing a plurality of other airstreams are not longer necessary.

Hence, the overall system simplification leads to a cost reduction and reduces installation materials and labour.

According to a further exemplary embodiment, the pressure inside the first housing section and/or the second housing section may be controlled by a pressure control unit. The pressure control unit may control the flow velocity of the air stream and/or respective flaps at the air inlet or air outlet. Furthermore, a pressure and/or vacuum generator may be coupled to the respective air inlet or outlet, in order to generate an overpressure or an under pressure inside the housing. The pressure control unit may control the pressure and/or vacuum generator.

For example, when using a gas fuel a fuel leak may be diluted in the ventilation air. If the gas fuel must be contained inside the housing, the pressure inside the housing need to be lower than the pressure outside the housing, such that any fuel can only escape via the ventilation flow path. On the other hand, if it is important to keep the inside of the housing clean, say if the gas turbine in installed in a location with dusty environment, then the pressure inside the housing need to be higher than outside the housing to prevent the dust from coming in via leakage paths. The pressure difference across the housing wall is determined by the location and performance of ventilation fan(s) which may be controlled by the pressure control unit.

According to a further exemplary embodiment of the present invention, the power generation system comprises a driving shaft arrangement which couples the alternator with the gas turbine. The driving shaft arrangement may comprise a driving shaft and/or a gear box for adjusting the driving torque of the driving shaft. By the driving shaft, the mechanical power generated by the gas turbine is transferred to the alternator for operating the alternator. The driving shaft may have a certain length such that the alternator and the gas turbine may be installed to the housing spaced apart from each other.

According to a further exemplary embodiment, the housing comprises an intermediate housing section which is located between the first housing section and the second housing section. The airstream is feedable into the intermediate housing section after the airstream has passed the alternator and is further feedable from the intermediate housing section into the second housing section. The driving shaft extends from the alternator through the intermediate housing section to the gas turbine.

The intermediate housing section may form an intermediate volume between (the first volume of) the first housing section and (the first volume of) the second housing section, such that the first housing section and the second housing section and their respective volumes are spaced apart from each other. Into the intermediate housing section, several system components, such as securing systems, fire protection systems and the like of the power generation system may be installed. The intermediate housing section may be separated to the respective first and second housing sections by respective separation walls or respective baffles. The driving shaft may be guided through the respective separation walls.

Furthermore, into the separation walls, respective openings may be formed such that the airstream may flow into the intermediate section. Additionally, connecting tubes may be installed within the intermediate section, such that the openings of the separation wall between the first housing section and the intermediate housing section and the openings and the separation wall between the intermediate housing section and the second housing section are connected by respective conduits (e.g. tubes or ducts) such that the airstream is guided through the intermediate housing section.

According to a further exemplary embodiment, the housing comprises a further air inlet, wherein the further air inlet is coupled to the gas turbine such that a further airstream is feedable into the gas turbine. Specifically, the further air inlet is arranged within the second housing section. The further airstream is used as working fluid for the gas turbine. Hence, the further airstream is guided through a gas turbine inlet and further through the combustion chamber of the gas turbine and through the respective turbine sections of the gas turbine.

The further airstream may be a ventilation and/or cooling air flow to significantly supplement the airstream and this provides enough air flow to cool a hot casing during operation when power is being generated at normal or operational loads and not only during or after engine shutdown. The further airstream may also provide minimum air flow velocities for dilution air in areas of the power generation system where explosive mixtures could arise.

Respectively, according to a further exemplary embodiment, the housing comprises a further air outlet, wherein the further air outlet is coupled to the gas turbine, such that an exhaust stream is exhaustable through the further air outlet out of the housing. The further air outlet may be formed as a respective opening in the second housing section. The further air outlet is coupled to the turbine section of the gas turbine such that the hot and expanded exhaust stream is blown out of the housing.

According to a further exemplary embodiment, the alternator comprises a cooling air inlet and a cooling air outlet. A part of the airstream in the first housing section is guidable through the cooling air inlet to an internal component, such as the windings of the alternator, wherein the part of the airstream is guidable through the cooling air outlet after passing the internal component of the alternator into the first housing section. Hence, a part of the air stream streams through the alternator and another part passes the alternator and cools the external surfaces of the alternator.

According to a further exemplary embodiment, the power generation system comprises a filter device for filtering the airstream, wherein the filtering device is arranged at the housing section such that the airstream is guidable through the filter device before being injected to the air inlet into the first housing section.

According to a further exemplary embodiment, the filter device may be arranged at the housing section in such a way, that both, the airstream and the further airstream, are filtered by the filtering device.

According to a further exemplary embodiment, the power generation system comprises a silencer for reducing a noise of the airstream when being exhausted through the air outlet. The silencer is arranged at the housing such that the airstream is guidable through the silencer after being exhausted through the air outlet out of the second housing section.

Summarizing, by the present invention, an airstream (ventilation air) is routed through a housing (enclosure) of a power generation system having an AC-generator and a gas turbine. Approximately half of the airflow is routed into the AC-generator machine for cooling internal components of the AC-generator and then into a second housing section to which the gas turbine is installed (gas turbine cell area). The other half of the airflow flows externally and passes the AC-generator and flows into the second housing section (the gas turbine cell). The airflow is then combined in the gas turbine cell area and exits the housing (enclosure) at an aft end, e.g. above the gas turbine exhaust (further air outlet) to the atmosphere. When being exhausted into the atmosphere, the airflow passes a silencer and a fan, for example.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless otherwise notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

FIG. 2 shows a perspective view of the exemplary embodiment of the present invention shown in FIG. 1; and FIG. 3 shows a perspective view of the power generation system according to an exemplary embodiment of the present invention.

DETAILED DESCRIPTION

Figure 1:
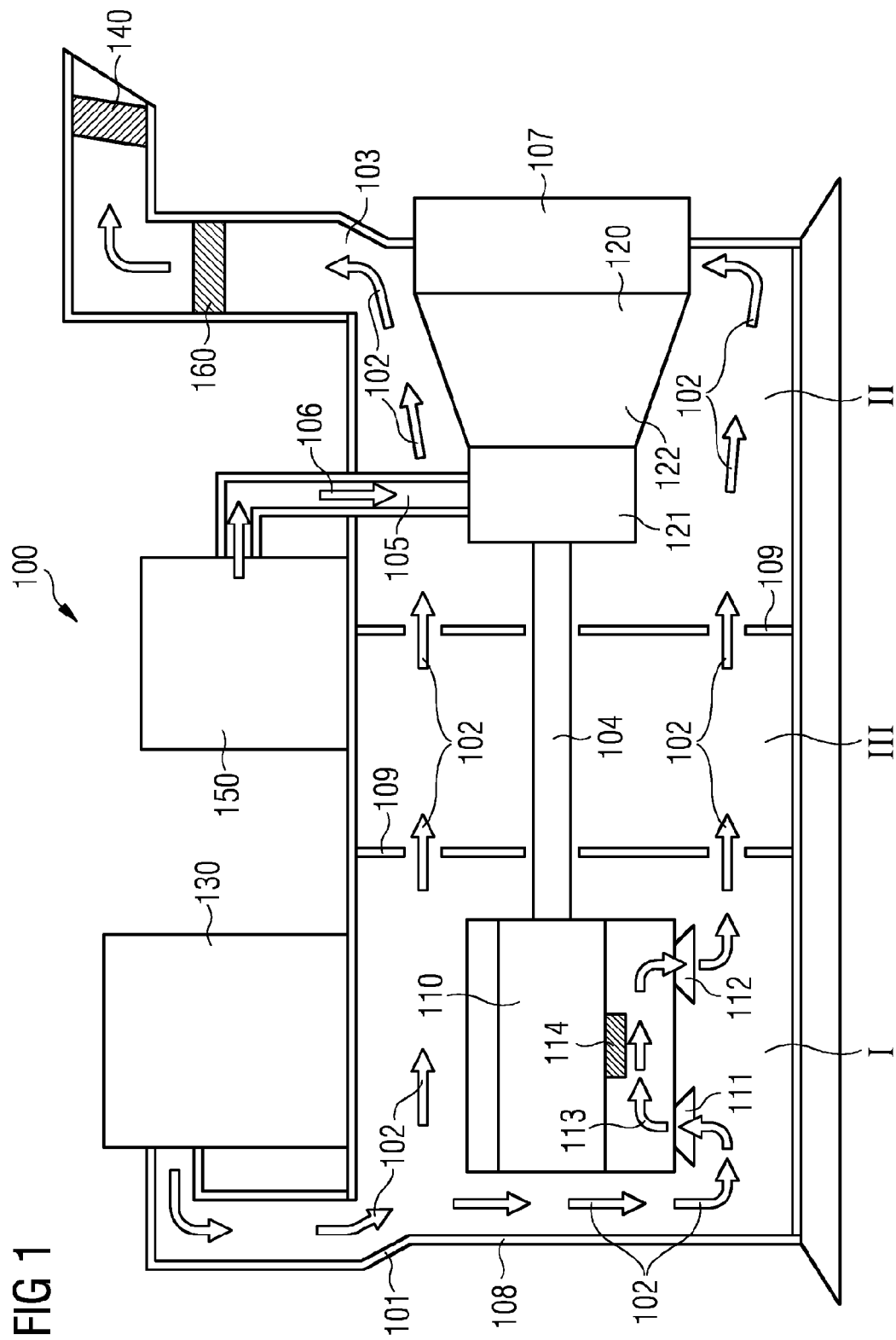
FIG. 1 shows a schematical view of an exemplary embodiment of the power generation system according to an exemplary embodiment of the present invention.

The illustrations in the drawings are schematical. It is noted that in different figures, similar or identical elements are provided with the same reference signs.

FIG. 1 and FIG. 2 show a power generation system 100 according to an exemplary embodiment of the present invention. The power generation system 100 comprises a housing 108 comprising a first housing section I and a second housing section II. An alternator 110 is arranged within the first housing section I and a gas turbine 120 is arranged within the second housing section II. The alternator 110 is driven by the gas turbine 120. For example, the gas turbine 120 is located spaced apart from the alternator 110, wherein a driving shaft 104 couples the gas turbine 120 with the alternator 110. Hence, the mechanical power generated by the gas turbine 120 is transferred to the alternator 110 for generating electrical power. In a different embodiment there may be an intermediate gearbox reducing the speed from the gas turbine rotor to the speed required by the alternator, typically one of 1500, 1800, 3000 or 3600 rpm.

The first housing section I comprises an air inlet 101 through which an airstream 102 is injectable into the first housing section I such that the airstream 102 passes the alternator 110 and cools the alternator 110. The first housing section I is coupled to the second housing section II such that the airstream 102 is feedable into the second housing section II after the airstream 102 has passed the alternator 110.

The second housing section II comprises an air outlet 103 through which the airstream 102 is exhaustable after passing the gas turbine 120.

The housing comprises a framework at which casing plates may be attached for forming inner volumes which are isolated from the environment. Hence, the first housing section I has a first inner volume and the second housing section II has a second volume, which are isolated from the environment.

Between the first housing section I and the second housing section II, an intermediate housing section III is located. Hence, the first housing section I and the second housing section II is spaced apart from each other. The driving shaft 104 may be guided through the intermediate section III as shown in FIGS. 1 and 2.

A ventilation system may generate the airstream 102. The ventilation system may be installed inside the housing 108 for sucking the airstream 102 into the housing 108 through the air inlet 101 and for blowing the airstream out of the housing 108 through the air outlet 103.

The airstream 102 may be filtered by a filter device 130. After filtering the airstream by the filter device 130, the airstream 102 flows through the air inlet 101. The air inlet 101 is formed to the first housing section I. After being injected into the first housing section I, the airstream 102 may pass the alternator 110 for cooling purposes.

The alternator 110 may comprise a cooling air inlet 111 and a cooling air outlet 112 through which a part 113 of the airstream 102 may be guided such that internal components 114 of the alternator 110 may be cooled. The internal components 114 are for example the coils and windings of the alternator, for example. At the air inlet 101, the airstream 102 may be separated into a first airstream passing the alternator 110 and into a second airstream which is guided through the respective cooling air inlet 111 and cooling air outlet 112. The first airstream may be directly and separately from the first airstream guided to the cooling air inlet 111, for example. After the second airstream exits the cooling air outlet 112 of the alternator 110, the second airstream leaves the cooling air outlet 112 and is mixed again with the first airstream which passes the alternator 110.

Alternately, the airstream 102 may be injected into the inner volume of the first housing section I and the airstream 102 may then flow from the inner volume to the cooling air inlet 111. Hence, the airstream 102 is not separated at the air inlet 101 of the first housing section I.

As shown in FIG. 1, between the first housing section I, the intermediate housing section III and the second housing section II, respective, separating walls 109 are installed into the housing. The respective separation walls 109 may comprise respective openings through which the airstream 102 may flow from the first housing section I to the intermediate housing section III into the second housing section II. Into the openings in the separation walls 109, respective non-return valves may be installed in order to prevent a backflow of the airstream 102 from the gas turbine 120 in the direction to the alternator 110.

The gas turbine 120 may comprise a combustion chamber 121 and a turbine section 122, i.e. an exhaust and diffuser section. The housing 108 and in particular the second housing section II comprise a further air inlet 105 through which a further airstream 106 may be injected, wherein the further airstream 106 is directly guided into the combustion chamber 121 of the gas turbine 120. The further airstream 106 may also be guided through a further filter device 150 or through the filter device 130 for the airstream 102. The further airstream 106 may be used for the working gas for the gas turbine 120.

After being combusted and expanded inside the turbine section 122, the further airstream 106 may be exhausted through a further air outlet 107 which is formed into the second housing section II. The further airstream 106 is separated from the airstream 102. The airstream 102 is exhausted through the air outlet 103.

To the air outlet 103, a fan 160 may be installed in order to blow out the airflow 102 through the air outlet 103.

Additionally, a silencer 140 may be coupled to the air outlet 102 in order to reduce the noise of the exhausted airstream 102.

In FIG. 2, similar elements and components of the power generation system 100 as shown in FIG. 1 are illustrated in a perspective view. In particular, as can be taken from FIG. 2, the filter device 130 and the further filter device 150 may be combined in one functional element. Furthermore, as can be taken from FIG. 2, inside the intermediate housing section III, a plurality of further auxiliary components, such as cut-out switches, fuses and fire protection systems for the power generation system 100 may be installed. The intermediate gear box may be installed for example into the intermediate housing section III. In the intermediate housing III, the gear box may be coupled to the driving shaft 104.

Further components, such as an oil cooler 201 for cooling the oil from the gas turbine 120 may be installed at the roof of the housing 108.

FIG. 3 shows the power generation system 100 of FIG. 2, wherein in FIG. 3 an exterior view of the housing 108 is illustrated. Several panels 301 are mounted to a respective framework of the housing 108, such that the inner volumes of the respective housing sections I, II and III are formed. The panels 301 form the housing sections I, II and III which are isolated from the environment. In FIG. 3, for sake of clarity not all panels 301 of the housing 108 are indicated with a respective reference sign.

It is noted that the term "gas turbine" is used also for the complete "gas turbine engine" and not only a turbine section of a gas turbine engine.

"Power generation system" is particularly considered to be a power generation system including a gas turbine engine, which drives an AC-generator, the latter also being part of the power generation system. The gas turbine engine and the AC-generator typically will be connected via a shaft, directly or via a gearbox.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A power generation system, comprising
a housing comprising a first housing section (I) and a second housing section (II),
an alternator arranged within the first housing section (I),
a gas turbine arranged within the second housing section (II),
wherein the alternator is drivable by the gas turbine,
wherein the first housing section (I) comprises an air inlet through which an airstream is injectable into the first housing section (I) such that the airstream passes the alternator and cools the alternator,
wherein the first housing section (I) is coupled to the second housing section (II) such that the airstream is feedable into the second housing section (II) after the airstream has passed the alternator,
wherein the second housing section (II) comprises an air outlet through which the airstream is exhaustable after passing the gas turbine, and
wherein the second housing section (II) comprises a further air inlet, the further air inlet is coupled to the gas turbine such that a further airstream is feedable into the gas turbine.

2. The power generation system according to claim 1, further comprising
a driving shaft arrangement which couples the alternator with the gas turbine.

3. The power generation system according to claim 2, wherein the housing comprises an intermediate housing section (III) which is located between the first housing section (I) and the second housing section (II), wherein the airstream is feedable into the intermediate housing section (III) after the airstream has passed the alternator and is further feedable from the intermediate housing section (III) into the second housing section (II), and
wherein the driving shaft arrangement extends from the alternator through the intermediate housing section (III) to the gas turbine.

4. The power generation system according to claim 1, wherein the second housing section (II) comprises a further air outlet,
wherein the further air outlet is coupled to the gas turbine such that an exhaust stream is exhaustable through the further air outlet out of the housing.

5. The power generation system according to claim 1, wherein the alternator comprises a cooling air inlet and a cooling air outlet,
wherein a part of the airstream in the first housing section (I) is guidable through the cooling air inlet to an internal component of the alternator, wherein the part of the airstream is guidable through the cooling air outlet after passing the internal component of the alternator into the first housing section (I).

6. The power generation system according to claim 1, further comprising
a filter device for filtering the airstream, wherein the filter device is arranged at the housing such that the airstream is guidable through the filter device before being injected through the air inlet into the first housing section (I).

7. The power generation system according to claim 1, further comprising
a silencer for reducing a noise of the airstream when being exhausted through the air outlet, wherein the silencer is arranged at the housing such that the airstream is guidable through the silencer after being exhausted through the air outlet out of the second housing section (II).

8. A method of operating a power generation system comprising a housing with a first housing section (I) and a second housing section (II), an alternator arranged within the first housing section (I) and a gas turbine arranged within the second housing section (II), the method comprising
driving the alternator by the gas turbine, injecting an airstream through an air inlet into the first housing section (I) such that the airstream passes the alternator and cools the alternator, wherein the first housing section (I) is coupled to the second housing section (II) such that the airstream is feedable into the second housing section (II) after the airstream has passed the alternator, exhausting the airstream through an air outlet of the second housing section (II) after the airstream has passed the gas turbine.

9. The method of operating a power generation system as claimed in claim 8, the method further comprising feeding a further airstream into the gas turbine via a further air inlet, the further air inlet is coupled to the gas turbine.

* * * * *